(12) United States Patent
Efrati et al.

(10) Patent No.: US 11,849,072 B2
(45) Date of Patent: Dec. 19, 2023

(54) METHOD AND SYSTEM FOR AUTOMATING CONFERENCING IN A COMMUNICATION SESSION

(71) Applicant: VONAGE BUSINESS INC., Atlanta, GA (US)

(72) Inventors: Tzahi Efrati, Hoboken, NJ (US); Jonathan Alexander, Roswell, GA (US); Sagi Dudai, Tel-Aviv (IL); Eugene Peter Cannon, Red Bank, NJ (US); Brian Grady Leno, New York, NY (US)

(73) Assignee: Vonage Business Inc., Atlanta, GA (US)

( * ) Notice: Subject to any disclaimer, the term of this patent is extended or adjusted under 35 U.S.C. 154(b) by 479 days.

(21) Appl. No.: 16/601,754

(22) Filed: Oct. 15, 2019

(65) Prior Publication Data

US 2020/0045182 A1 Feb. 6, 2020

Related U.S. Application Data

(63) Continuation of application No. 14/581,387, filed on Dec. 23, 2014, now abandoned, which is a
(Continued)

(51) Int. Cl.
*H04M 3/56* (2006.01)
*H04L 12/18* (2006.01)
(Continued)

(52) U.S. Cl.
CPC .......... *H04M 3/56* (2013.01); *H04L 12/1818* (2013.01); *H04L 12/1822* (2013.01);
(Continued)

(58) Field of Classification Search
CPC .......... H04M 3/56; H04M 3/563–566; H04M 2203/5018; H04L 12/1818; H04L 12/1822;
(Continued)

(56) References Cited

U.S. PATENT DOCUMENTS 7,180,890 B2  2/2007  Bushnell et al.
RE40,704 E    4/2009  Riddle
(Continued)

FOREIGN PATENT DOCUMENTS

GB   2469720 A   10/2010

OTHER PUBLICATIONS

International Search Report and Written Opinion for Application No. PCT/US2014/061499, 8 pages, dated Jan. 26, 2015.
(Continued)

*Primary Examiner* — Un C Cho
*Assistant Examiner* — Lalita W Pace
(74) *Attorney, Agent, or Firm* — MOSER TABOADA; Joseph Pagnotta (57) ABSTRACT

Methods and system for automating conferencing in a communication session are provided herein. In some embodiments, a method for automating conferencing in a communication session includes establishing a communication session between a first end-user device and a second end-user device; receiving a first notification message from the first end-user device indicating that the communication session is at least one of visible or joinable by one or more devices associated with the first end-user device, wherein the one or more devices are associated with the first end-user device when the one or more devices are one of (i) pre-registered and stored with an association to the first end-user device, (ii) pre-authenticated to tether the one or more devices to the first end-user device, or (iii) pre-associated
(Continued)

with a same user account profile; and sending a second notification message to the one or more devices associated with the first end-user device.

17 Claims, 8 Drawing Sheets

Related U.S. Application Data continuation-in-part of application No. 14/058,918, filed on Oct. 21, 2013, now abandoned.

(51) Int. Cl.

| | |
|---|---|
| *H04L 65/403* | (2022.01) |
| *H04L 65/1069* | (2022.01) |
| *H04L 65/1033* | (2022.01) |
| *H04L 51/043* | (2022.01) |
| *H04L 65/1093* | (2022.01) |
| *H04L 65/65* | (2022.01) |
| *H04L 65/1045* | (2022.01) |
| *H04L 65/1104* | (2022.01) |
| *H04L 67/54* | (2022.01) |

(52) U.S. Cl.
CPC .......... *H04L 51/043* (2013.01); *H04L 65/104* (2013.01); *H04L 65/1033* (2013.01); *H04L 65/1045* (2022.05); *H04L 65/1069* (2013.01); *H04L 65/1093* (2013.01); *H04L 65/1104* (2022.05); *H04L 65/403* (2013.01); *H04L 65/65* (2022.05); *H04L 67/54* (2022.05); *H04M 3/563* (2013.01); *H04L 12/189* (2013.01); *H04M 2203/5018* (2013.01)

(58) Field of Classification Search
CPC ... H04L 12/185; H04L 12/189; H04L 51/043; H04L 51/04; H04L 65/1093; H04L 65/608; H04L 65/104; H04L 65/105; H04L 65/1006; H04L 65/1033; H04L 65/403; H04L 65/1069; H04L 65/1083; H04L 67/14; H04L 67/24; H04L 65/1045; H04L 65/1104; H04L 65/65; H04L 67/54; H04W 4/16
See application file for complete search history.

(56) References Cited

U.S. PATENT DOCUMENTS

| | | | |
|---|---|---|---|
| 8,447,176 B2 | 7/2013 | Cortes et al. | |
| 8,483,375 B2 | 7/2013 | Dhara et al. | |
| 8,811,177 B1 | 8/2014 | Toudeh-Fallah et al. | |
| 8,929,257 B1 | 1/2015 | Goepp et al. | |
| 8,970,660 B1 | 3/2015 | Rudkowski et al. | |
| 2002/0078153 A1* | 6/2002 | Chung | H04Q 11/0435 709/204 |
| 2004/0259580 A1 | 12/2004 | Florkey et al. | |
| 2007/0002779 A1 | 1/2007 | Lee et al. | |
| 2007/0050509 A1 | 3/2007 | Litteaut et al. | |
| 2007/0280464 A1 | 12/2007 | Hughes et al. | |
| 2008/0010347 A1 | 1/2008 | Houghton et al. | |
| 2008/0159509 A1 | 7/2008 | Whitfield et al. | |
| 2010/0061539 A1 | 3/2010 | Cloran et al. | |
| 2010/0246788 A1 | 9/2010 | Menard et al. | |
| 2010/0251177 A1* | 9/2010 | Geppert | H04M 1/27475 715/821 |
| 2010/0272245 A1 | 10/2010 | Brunson | |
| 2010/0299736 A1 | 11/2010 | Yoakum et al. | |
| 2011/0149810 A1 | 6/2011 | Koren et al. | |
| 2011/0191692 A1 | 8/2011 | Walsh et al. | |
| 2011/0270922 A1* | 11/2011 | Jones | H04L 65/1093 709/204 |
| 2011/0276880 A1 | 11/2011 | Greenfield | |
| 2012/0275349 A1 | 11/2012 | Boyer et al. | |
| 2013/0114511 A1 | 5/2013 | Ma et al. | |
| 2013/0138818 A1 | 5/2013 | Wolf | |
| 2013/0227006 A1 | 8/2013 | Raju | |
| 2013/0263020 A1* | 10/2013 | Heiferman | H04L 12/1818 715/753 |
| 2014/0019549 A1 | 1/2014 | Wei | |
| 2014/0026074 A1 | 1/2014 | Cortes et al. | |
| 2014/0036733 A1 | 2/2014 | Teng et al. | |
| 2014/0068710 A1* | 3/2014 | Lau | H04L 12/66 726/3 |
| 2014/0269440 A1 | 9/2014 | Efrati et al. | |
| 2014/0269498 A1 | 9/2014 | Efrati et al. | |
| 2014/0269612 A1 | 9/2014 | Efrati et al. | |
| 2014/0270129 A1 | 9/2014 | Bracken et al. | |
| 2014/0317205 A1* | 10/2014 | Rande | H04L 12/1822 709/206 |
| 2015/0029899 A1 | 1/2015 | Patel et al. | |
| 2015/0109968 A1 | 4/2015 | Leno et al. | |

OTHER PUBLICATIONS

International Search Report and Written Opinion for Application No. PCT/IB2015/059951, 14 pages, dated Jul. 1, 2016.

* cited by examiner

METHOD AND SYSTEM FOR AUTOMATING CONFERENCING IN A COMMUNICATION SESSION

CROSS-REFERENCE TO RELATED APPLICATIONS

This application is a continuation of co-pending U.S. patent application Ser. No. 14/581,387 filed Dec. 23, 2014, which is a continuation-in-part of U.S. patent application Ser. No. 14/058,918 filed Oct. 21, 2013. Each of the aforementioned patent applications are herein incorporated in its entirety by reference.

BACKGROUND OF THE INVENTION

Field of the Invention

Embodiments consistent with the present invention generally relate to a method and system for automated conferencing in a communication session.

Description of the Related Art

A landline telephone (also known as land line, land-line, main line, home phone, landline, fixed-line, and wireline) refers to a phone line which uses a solid medium telephone line such as a metal wire or fiber optic cable for transmission as distinguished from a mobile cellular line which uses radio waves for transmission. Typically, in a home with a landline, when one phone was in use, another household member could easily join the conversation by simply picking up another phone on the same line.

The ability to easily join a conversation by just picking up a phone on the same line has been lost with the advent of mobile telephony. Specifically, each user has a mobile phone with a separate mobile phone number, i.e., their own line. Thus, there is a disjointedness of mobile phones with separate lines that contrasts with the previous convenience of automatically joining a conversation.

For conference calls to be established, a user in the original call must make an active step of notifying a third party user of the communication or the third party user must know to dial into the conversation at a pre-designated time.

Accordingly, there is a need for a method and system for automated conferencing in a communication session.

SUMMARY OF THE INVENTION

Methods and system for automating conferencing in a communication session are provided herein. In some embodiments, a method for automating conferencing in a communication session includes detecting an established communication session between a first end-user device and a second end-user device, notifying a third end-user device associated with the first user device that the established communication session is available to be joined, receiving a request from the third end-user device to join the communication session, and establishing a conference session with the first end-user device, the second-end user device, and the third end-user device.

In some embodiments, a method for automating conferencing into a communication session includes receiving a notification that an established communication session between a first end-user device and a second end-user device is available to be joined and sending a request to join the established communication session, and establishing a conference session with the first end-user device, the second-end user device, and the third end-user device.

In some embodiments, a system for automating conferencing into a communication session includes: at least one processor, at least one input device coupled to at least one network, and at least one storage device storing processor executable instructions which, when executed by the at least one processor, performs a method. In some embodiments, the method may include detecting an established communication session between a first end-user device and a second end-user device, notifying a third end-user device associated with the first user device that the established communication session is available to be joined, receiving a request from the third end-user device to join the communication session, and establishing a conference session with the first end-user device, the second-end user device, and the third end-user device.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention are directed to methods, apparatus, and systems for automatically conferencing additional devices. The embodiments discussed herein may include devices using mobile communications. One non-limiting form of mobile communications is Voice over IP (VoIP), which is utilized to establish and provide voice communications over a data network using the Internet Protocol (IP). Businesses and individuals implement VoIP by installing the necessary equipment and service (i.e., a "high speed" network or broadband connection) to access a VoIP service provider and activating this telecommunication service. Calls from a VoIP subscriber device to a destination device may be routed via a number of interconnected networks, such as via the VoIP service provider network, mobile telephone service provider networks, and existing and traditional telecommunications system more commonly referred to as the Public Switched Telephone Network (PSTN) or Plain Old Telephone Service (POTS).

VoIP service providers may provide mobile or desktop VoIP applications (apps) that users can install on their smartphone or other type of mobile or stationary computing devices, or may provide VoIP Telephone/Device Adaptors (TA) that can be used with traditional hardwire telephones. Such apps also include over the top (OTT) applications. OTT describes a category of applications where content is delivered without a multiple system operator involved in the control or redistribution of the content.

At least a portion of the call may be transmitted as packets over an IP network, via WIFI for example, rather than over traditional mobile phone mobile communication technology standards (e.g., 2G, 3G, and the like). By transmitting voice as packet data over an IP network, these mobile apps can allow a user to make calls to another OTT client or an off-net destination. They may be used when the user is connected to a base station over the mobile operator's cell network, over a third-party's Wi-Fi access point, over WI MAX, and the like.

Figure 1A:
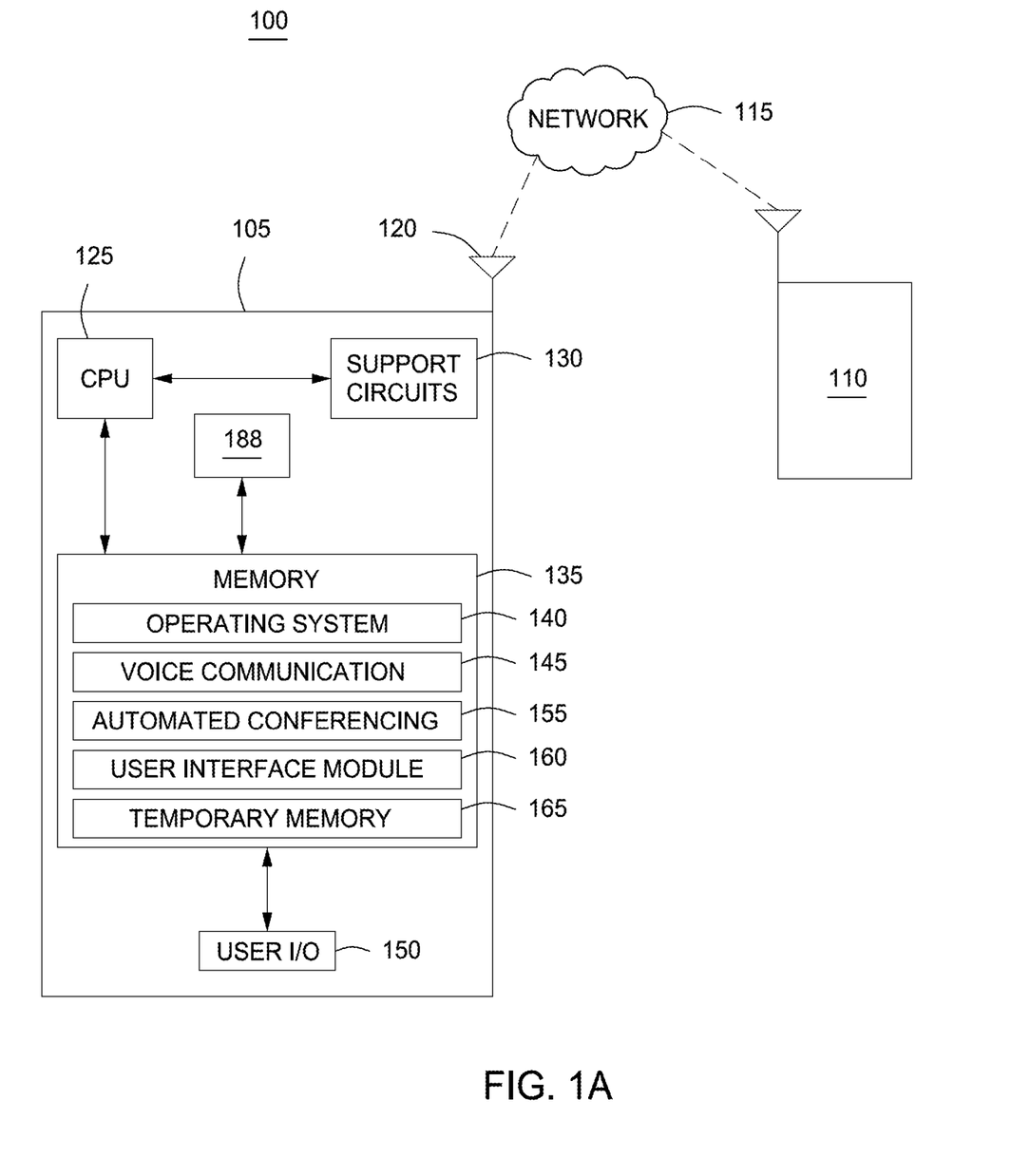
FIGS. 1A and 1B are illustrations of a communication system including a first device and at least one second device in accordance with one or more exemplary embodiments of the invention.

FIG. 1A is an illustration of a communication system 100 including a first user device 105 and at least one second user device 110 in accordance with one or more exemplary embodiments of the invention. The exemplary mobile communication system 100 includes a communications network 115, the first device 105, and the second device 110. The two devices are connected to the communications network 115 that may use Session Initiation Protocol (SIP), Voice over Internet Protocol (VoIP), and the like to form a voice call session. The connection may be wired or wireless. The communications network 115 may be one or more networks such as Internet Protocol (IP) networks or public switched telephone networks (PSTN) used to connect the first 105 and second devices 110. The first and second devices (105, 110) may be electronic user devices (e.g., telephones, personal computers, laptops, smart phones, mobile phones, tablets, and the like).

The communications network 115 allows for user devices (wired or wireless) to exchange data and voice communications. Since video or images captured by the camera are digitized for sending across the network 115, video calls are a form of data communication. The communications network 115 is capable of processing the sending and receiving of both and voice and data streams between the first device 105 and the second device 110. The first device 105 includes an antenna 120, a CPU 125, support circuits 130, memory 135, input/output (I/O) interface 150, and at least one camera 188. Some embodiments may include more than one camera on the respective devices (105, 110). The support circuits 130 include circuits for interfacing the CPU 125 and memory 135 with the antenna 120 and input/output interface 150. The I/O interface 150 may include a speaker, microphone, additional camera optics, touch screen, buttons and the like for a user to interact with the first device 105.

The memory 135 includes an operating system 141, a communication module 145, an automated conferencing module 155, a user interface module 160, and a temporary memory module 165. The operating system 141 controls the interoperability of the support circuits 130, CPU 125, memory 135, and the I/O interface 150. The user interface module 160 contains instructions for the I/O interface 150 to interact with the operating system 141 such as for a graphical user interface (GUI). The voice communication module 145 may establish a communication session via cellular communication (CDMA, GSM, etc.).

The automated conferencing module 155 processes signaling on the network 115 to allow a device of a third party to join an established communication session between the first device 105 and the second device 110. The automated conferencing module 155 sends a signal to the network 115 to allow a third party to be invited to join the communication session. As will be discussed further below, the resulting communication session will be a conference session. In other embodiments, the automated conferencing module 155, may be included within a server in the network 115 as opposed to purely within an electronic user device. In such embodiments, the automated conferencing module 155 is stored on a server on the network for automatic notification to devices of third parties of the communication session after the communication session is established.

The third party devices are user devices that may be associated with the first user device via a pre-registration process. For example, the phone numbers of the first user device and the third party device may be stored in association with each other, or they may be associated to the same account profile stored on the network 115. Alternatively, third party devices may register with the first user device via a local network. In such embodiments, the registration is achieved via a GUI on the devices and stored on the first user device. Thus the third party devices are pre-authenticated to tether to the first user device. In further embodiments, third party devices may also be pre-associated with the same account and preauthorized in the VoIP or OTT application. In the aforementioned examples, such devices may be owned by family members (e.g., $X_1$ and $X_2$) that routinely join an on-going call communication session (e.g., with $Y_1$).

Pre-authentication allows automatic joining of a communication session or may request to join the communication session after receiving a notification on the third party device (text message, push message, ring tone, and the like). Upon accepting the notification (e.g., answering the phone), third party devices are conferenced into the existing communication session.

Figure 1B:
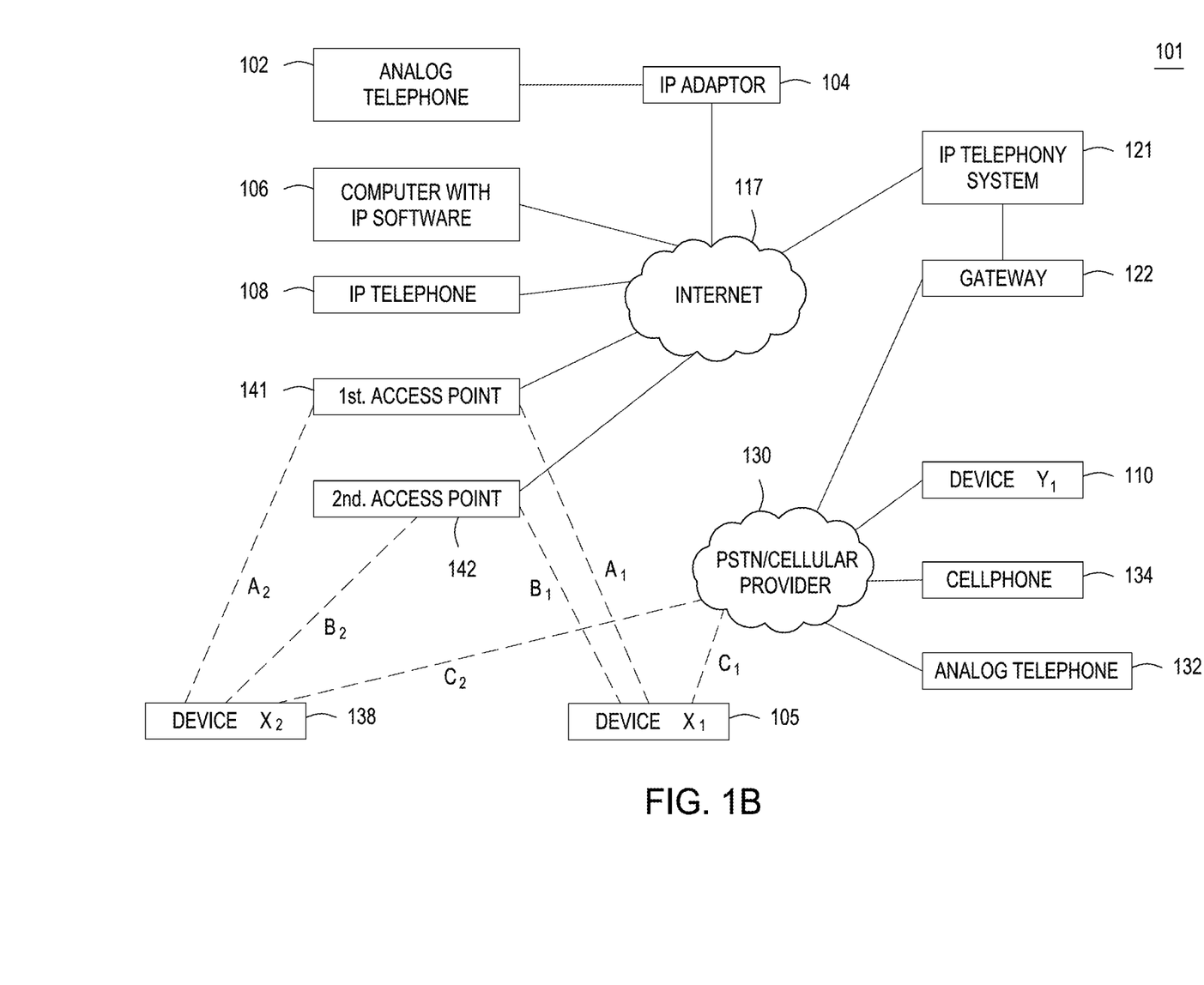

FIG. 1B illustrates an exemplary VoIP communications environment 101 embodiment facilitate IP enhanced communications. The depicted embodiment includes data network 117 and publicly switched telephone network (PSTN) 130 as part of network 115 of FIG. 1A. An IP telephony system 121 enables connection of telephone calls between its own customers and other parties via data communications that pass over a data network 117. The data network 117 is commonly the Internet, although the IP telephony system 121 may also make use of private data networks. The IP telephony system 121 is connected to the Internet 117. In addition, the IP telephony system 121 is connected to a publicly switched telephone network (PSTN) 130 via a gateway 122. The PSTN 130 may also be directly coupled to the Internet 117 through one of its own internal gateways (not shown). Thus, communications may pass back and forth between the IP telephony system 121 and the PSTN 130 through the Internet 117 via a gateway maintained within the PSTN 130.

The gateway 122 allows users and devices that are connected to the PSTN 130 to connect with users and devices that are reachable through the IP telephony system 121, and vice versa. In some instances, the gateway 122 would be a part of the IP telephony system 121. In other instances, the gateway 122 could be maintained by a third party.

Customers of the IP telephony system 121 can place and receive telephone calls using an IP telephone 108 that is connected to the Internet 117. Such an IP telephone 108 could be connected to an Internet service provider via a wired connection or via a wireless router. In some instances, the IP telephone 108 could utilize the data channel of a cellular telephone system to access the Internet 117.

The second user device 110 customer could in some embodiments be an analog telephone 102 which is connected to the Internet 117 via a telephone adapter 104. The telephone adapter 104 converts analog signals from the analog telephone 102 into data signals that pass over the Internet 117, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 121.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 121 are able to access the service from virtually any location where they can connect to the Internet 117. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 121.

A third party using an analog telephone 132 which is connected to the PSTN 130 may call a customer of the IP telephony system 121. In this instance, the call is initially connected from the analog telephone 132 to the PSTN 130, and then from the PSTN 130, through the gateway 122 to the IP telephony system 121. The IP telephony system 121 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the Apple iPhone™, that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include the Apple iPod Touch™ and the iPad™. Such a device may act as a mobile telephony device once it is configured with appropriate application software.

FIG. 1B illustrates that a computing device with cellular capabilities (such as first user device 105) is capable of establishing a first wireless data connection $A_1$ with a first wireless access point 141141, such as a WIFI or WI MAX router. The first wireless access point 141 is coupled to the Internet 117. Thus, the first user device 105 can establish a VOIP telephone call with the IP telephony system 121 via a path through the Internet 117 and the first wireless access point 141.

FIG. 1B also illustrates that the first user device 105 can establish a second wireless data connection $B_1$ with a second wireless access point 142 that is also coupled to the Internet 117. Further, the first user device 105 can establish a third wireless data connection $C_1$ via a data channel provided by a cellular service provider 130 using its cellular telephone capabilities. The first user device 105 could also establish a VOIP telephone call with the IP telephony system 121 via the second wireless connection $B_1$ or the third wireless connection $C_1$.

A third user device 138 similarly uses connections $A_2$, $B_2$, or $C_2$ to connect to the Internet 117 and cellular service provider 130 for automatic conferencing. Thus, the third user device 138 may be communicatively coupled to the Internet for VOIP communication via multiple devices such as the first access point 141, the second access point 142, or cellular provider 130. The third user device 138 initially receives notifications from connections $A_2$, $B_2$, or $C_2$ of the communication session between the first user device 105 and second user device 110. Subsequently, the third user device 138 may be automatically conferenced into a conference session with the first and second user devices (105 and 110) using connections $A_2$, $B_2$, and $C_2$.

Although not illustrated in FIG. 1B, the first user device 105 may be capable of establishing a wireless data connection to a data network, such as the Internet 117, via alternate means. For example, the first user device 105 might link to some other type of wireless interface using an alternate communication protocol, such as the WI MAX standard.

Figure 2A:
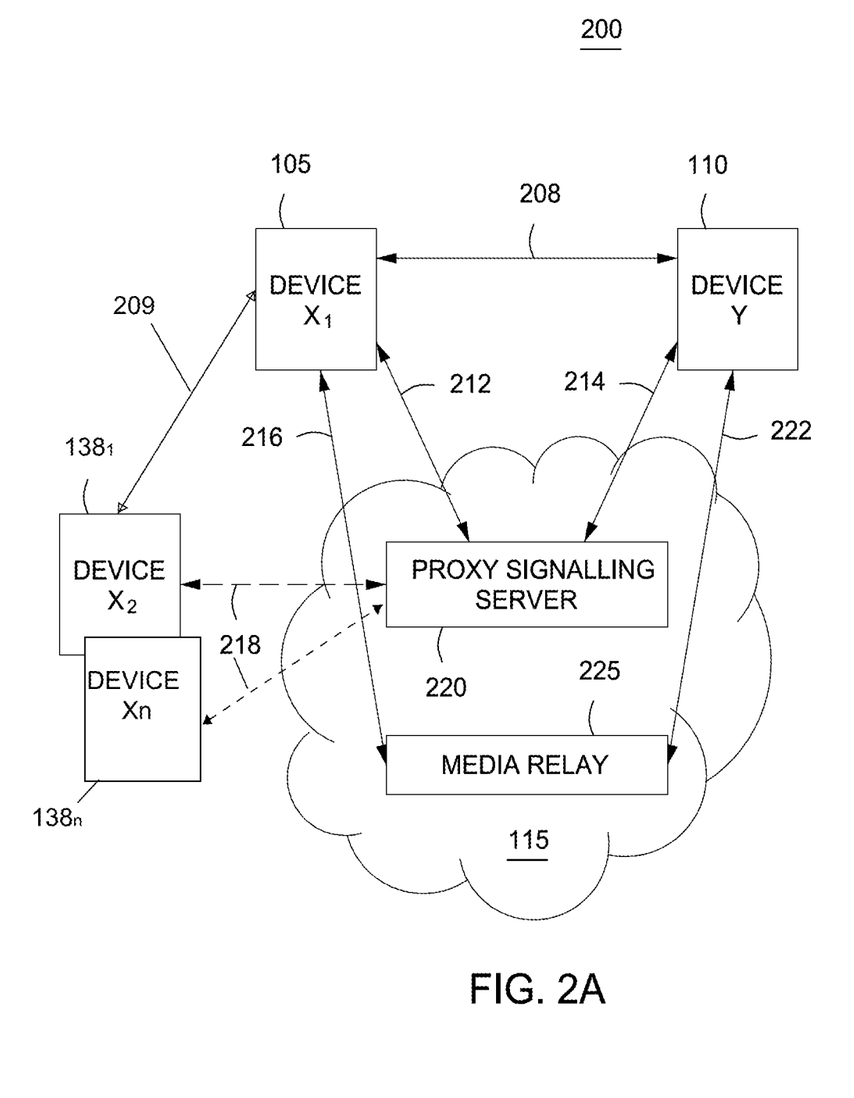
FIGS. 2A and 2B are illustrations of an exemplary system for automatically conferencing additional devices in accordance with one or more embodiments of the invention.
Figure 2B:
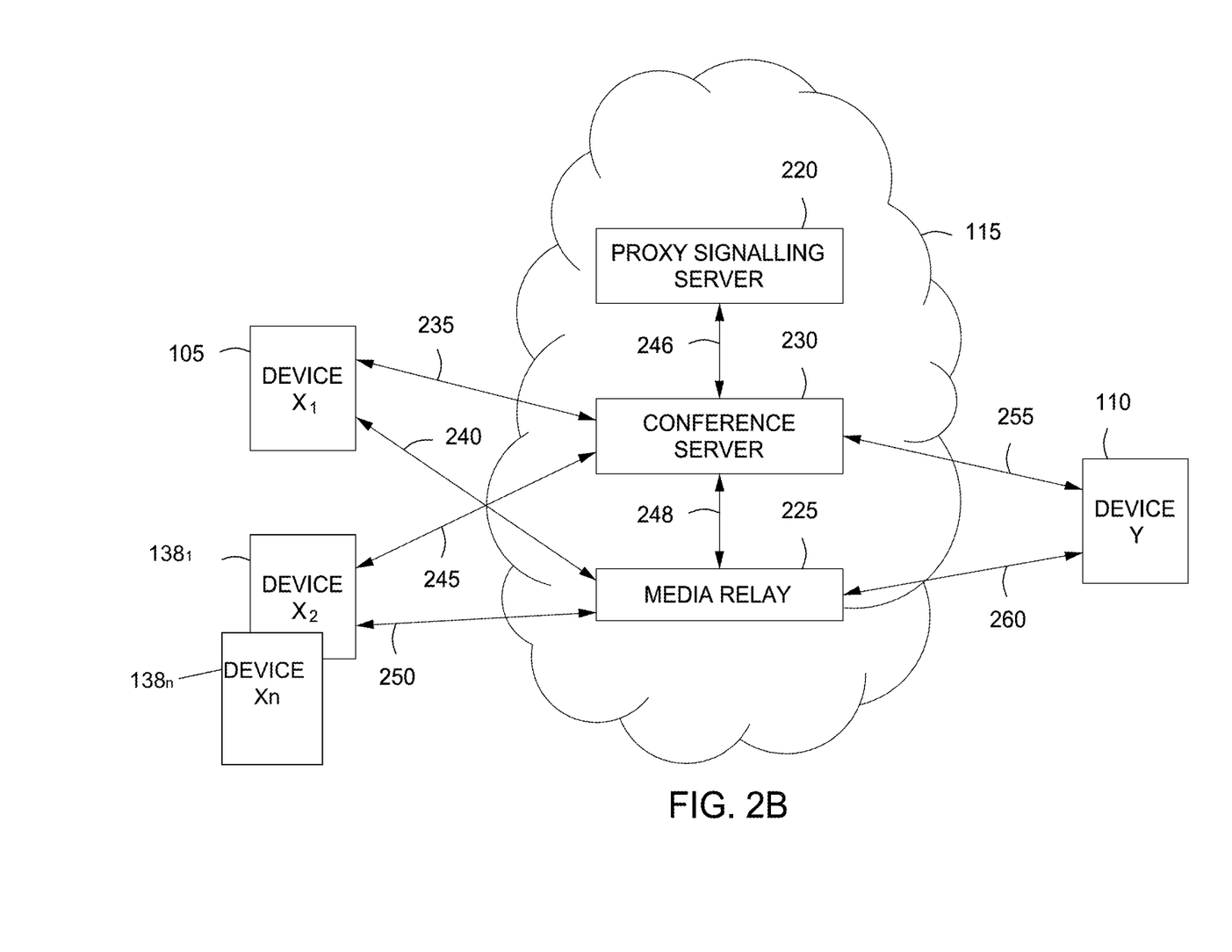
Figure 3:
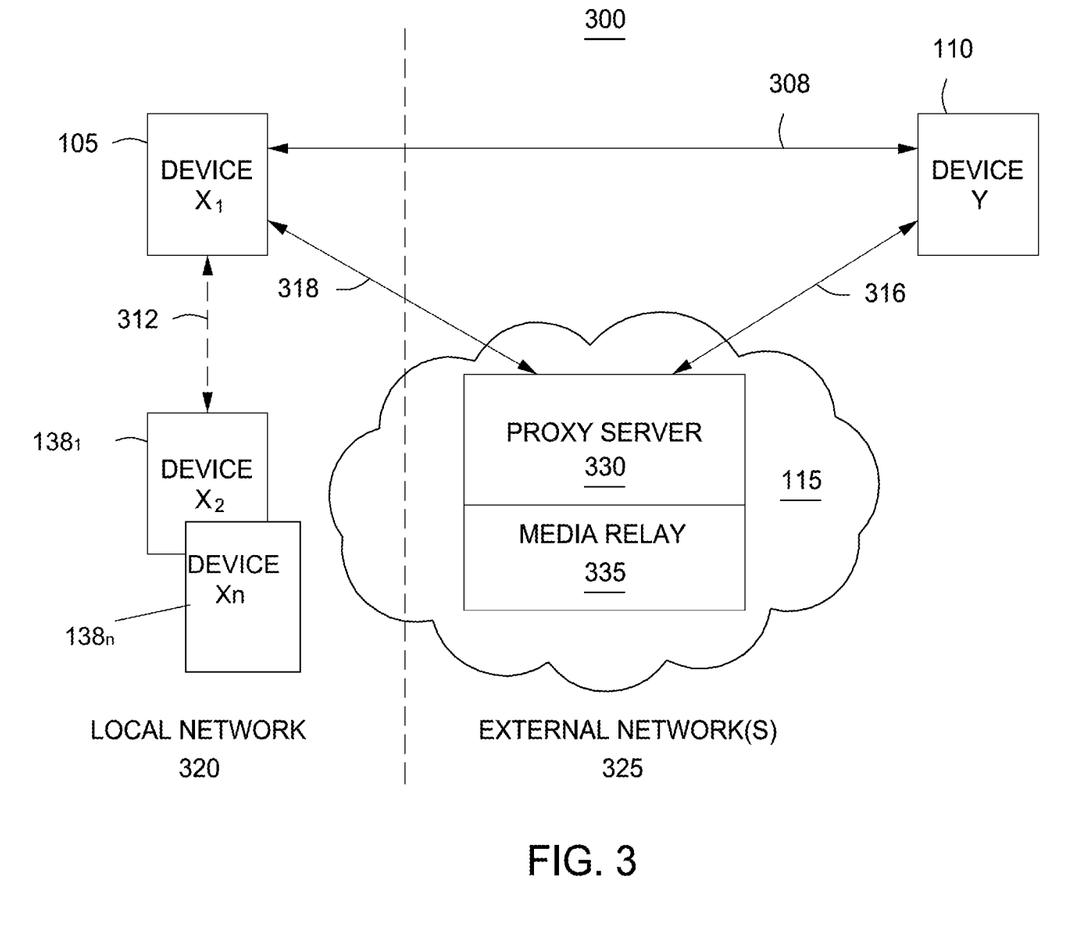
FIG. 3 is an illustration of an exemplary system for automatically conferencing additional devices across networks in accordance with one or more embodiments of the invention.

FIGS. 2A, 2B, and 3 are illustrations of exemplary systems 200 and 300 for automatically conferencing additional devices in accordance with one or more embodiments of the invention. The figures have been reduced for ease of understanding. In FIGS. 2A, 2B, and 3, a first user device 105 is in a communication session 208 with a second user device 110 using the network 115. In FIG. 2A, the network 115 includes a proxy signaling server 220 and media relay 225. The proxy server 220 communicates with the first user device 105 using SIP signaling. A first signal (arrow 212) and second signal (arrow 214) negotiate and establish the communication session 208. The proxy server 220 also sends a notification or "pickup" signal (arrow 218) to one or more third user devices $138_1$-$138_n$ after the communication session 208 is established. The media relay 225 coordinates and sends communication data packets via data streams (arrows 216 and 222) between the first user device 105 and second user device 110 for the first communication session 208.

In FIGS. 2A, 2B, and 3, the first user device 105 and the one or more third user devices $138_1$-$138_n$ are associated with each other. For example, in some embodiments, the first user device 105 and the one or more third user devices $138_1$-$138_n$ are associated with a shared telephony service account. In other embodiments, the first user device 105 and the one or more third user devices $138_1$-$138_n$ have registered their respective communication identifiers (e.g., phone numbers, device IDs, account IDs, and the like) with a telephony service provider (e.g., IP telephony system 121, PSTN/Cellular provider 130) such that the devices are associated with each other.

When devices are associated with each as described above, a call directed to one of the associated devices (e.g., first user device 105) may also be directed, or otherwise announced, to one or more of the other associated devices (e.g., the one or more third user devices $138_1$-$138_n$) based on some predefined configuration settings. For example, in some embodiments, when an incoming call is directed to a first user device 105 that is associated with one or more third user devices $138_1$-$138_n$, all associated devices may ring or otherwise display an indication of the incoming call. Similarly, when the first user device 105 that is associated with one or more third user devices $138_1$-$138_n$ makes a call to user device 110, for example, the associated one or more third user devices $138_1$-$138_n$ may display an indication of the call that is in the process of being established or has been established. That is, the call may be designated as visible and joinable by any one or all of the user devices 105, $138_1$-$138_n$, each of which may pick up or join the call. The call may be automatically designated as visible and/or joinable by one or more of the associated devices, or may explicitly designated as visible and/or joinable by the first user device 105 for example.

In some embodiments, a user device (e.g., first user device 105) that establishes an outgoing call, or picks up an incoming call, may designate the call as a private call and thus prevent one or more of the other user devices (e.g., the one or more third user devices $138_1$-$138_n$) from being able to join/answer the call. In some embodiments, not all associated devices will ring or be notified of a call. For example, in some embodiments, a call from user device 110 to the contact identifier of the first user device 105 will only ring on first user device 105 and not on the associated one or more third user devices $138_1$-$138_n$. The first user device 105 may also prevent a call that is designated as a private call from showing up in the call histories of the one or more third user devices $138_1$-$138_n$. For example, in some embodiments, the first user device 105 may display options on the screen to allow the user to designate the call as either private or visible/joinable. The selection of one of the options will send a signal/notification (e.g., SIP message, HTTP, SS7, and the like) to the proxy signaling server 220, or to a conference server 230 as shown in FIG. 2B, or directly to the one or more user devices $138_1$-$138_n$ on a local network as shown in FIG. 3) indicating the option selected. In other embodiments, the first user device 105 may designate that the one or more third user devices $138_1$-$138_n$ may only see that a call from user device 110 has arrived or is in progress but not be allowed to join. The first user device 105 may also designate that the one or more third user devices $138_1$-$138_n$ may only listen in on the call between user device 105 and user device 110 but not actively participate on the call.

In some embodiments, the first user device 105 may "share their screen" with an associated device (e.g., in the case of a video call) to allow the associated device to both listen and see the video call, and to join in if authorized by the first user device 105. As used herein, sharing their screen means a sharing a video stream (i.e., authorizing another user/device to view the video stream). The first user device may control what portions of the video stream the associated devices can see or hear. For example, if the incoming video stream consists of two video sources (e.g., the speaker/presenter and a presentation), the user of the first user device 105 can decide to share only one of these sources and not both. To share the screen/video stream, the first user device 105 may send a notification to the associated one or more third user devices $138_1$-$138_n$, either directly or through network 115, indicating that the first user devices is requesting to share its screen and have the associated user device join the call. The notification may be a SIP message, HTTP, or other type of signaling message. If the associated user device accepts, the first user device 105 may begin streaming the media associated with the video call, for example, to the associated user device either directly or through network 115. The media may be streamed via Real-time Streaming Protocol (RTSP), Real-time Transport Protocol (RTP) and the Real-time Transport Control Protocol (RTCP), User Datagram Protocol (UDP), and the like.

In some embodiments, when two or more associated user devices (e.g., first user device 105 and one or more of the third user devices $138_1$-$138_n$) are on a call with user device 110, two or more of the associated devices may wish to establish a "private" line within the context of the call. The private line may be a voice channel, text channel, multimedia/video channel, RTP channel, and the like. The private line between two or more of the associated devices may be activated by a selection of button displayed on the first user device 105, for example, or a selection of a user device identifier from a list of user device identifiers on the call. In some embodiments, a private line can also be requested by any party on the call and accepted or rejected by any of the recipients of the private line request. The setup of the call between the two associated user devices may be through standard SIP signaling, push to talk signaling, or other type of signaling.

In some embodiments, when an associated device joins an ongoing call, they may do so anonymously such that, for example, either or both the first user device 105 or the second user device 110 does not know that one or more of the third user devices $138_1$-$138_n$ joined the call. In other embodiments, an indication will be displayed (or an audible tone played) on either or both of the first user device 105 or the second user device 110 notifying the users of those devices that the call has been joined. The indication may include an identification (e.g., communication identifier) of the party that joined. In some embodiments, an associated device that is notified of an ongoing call may just record the call rather than joining the call.

In some embodiments, the only associated devices that will ring or be notified of an incoming/outgoing call to/from user device 110 are those devices that have a contact identifier of user device 110 in their address books and/or call history. For example, if an incoming call from user device 110 is directed to the first user device, a third user device (e.g., one or more of devices $138_1$-$138_n$) may be notified if the third user device has participated in previous calls with user device 110. The call history may be stored in a call history database stored on network 115 or in the local memory of the third user device. In other embodiments, configuration settings stored with the shared account on the telephony service provider network may include a list of communication identifiers and the associated devices that may view/join calls to/from the specific communication identifiers listed. In addition, the configurations settings may provide the ability to designate groups or classes of associated devices. For example, a family has four members (father, mother, son and daughter) each with an associated device on a shared account. The configuration settings may be edited (by an authorized user of the account) to assign the communication/device identifier associated with the father and mother user devices to a "parent" group and the communication/device identifier associated with the son and daughter user devices to a "children" group. The configuration settings may also include settings that list one or more numbers that should only be visible/joinable by the parent group and not the children group. The communication identifiers described above may include phone numbers, device identifiers, telephony service account identifiers, Caller ID Name (CNAM) identifiers, and the like.

The notification of an ongoing call may be sent, in some embodiments, to an associated device or group of associated devices (e.g., devices belonging to a "parent" group in the configuration settings) based on certain actions that occur during the original call. For example, the proxy server 220, conference server 230, or the automated conferencing module 155 on the user device may use smart monitoring to monitor a call and only provide notifications in certain scenarios. In some embodiments, certain key words detected during the call could trigger a notification to an associated device or group of associated devices. For example, the configuration settings may include certain inappropriate key words that if spoken during a call involving a child device would trigger a notification to the devices in the "parent" group, or to a specified associated device, to indicate that the parent device should join the call. The parent user device would then be able to monitor the call that the child user device is participating in either announced or anonymously depending on configuration settings. Other examples may include a supervisor may be notified of calls between employees and customers based on key words spoken, tone of the call (e.g., yelling or raised voices detected), if the customer is configured in the configuration settings as a VIP customer, and the like. In some embodiments, the associated device that is notified and joins the ongoing may have the authority to terminate the call between the original parties by sending a termination signal to the proxy server 220, conference server 230, or directly to the associated device.

In some embodiments, when the first user device 105 is on a call with the second user device 110 and wants to transfer the call to one of the associated third user devices $138_1$-$138_n$, the associated third user devices $138_1$-$138_n$ that the call is being transferred to is notified of the transferred call. The associated third user devices $138_1$-$138_n$ will display the communication identifier of the party that is transferring the call and the communication identifier of the party that is being transferred. In some embodiments, all associated devices that are able to view and/or join an ongoing call may be able to display or retrieve more detailed information about the ongoing call such as, commutation identifiers (phone numbers, CNAM, etc.) of all devices on the call, where each of the associated devices on the call are located, which associated user devices are on the call and their associated device capabilities (e.g., video display capabilities), and the like.

FIG. 2B is an illustration of the exemplary system 200 wherein one or more of the one or more third user devices $138_1$-$138_n$ have elected to conference into the original communication session 208. The proxy server 220 hands the communication session 208 over to the conference server 230. In alternative embodiments, the conference server 230 is a sub-module of the proxy server 220 to handle conference sessions. Further still, are embodiments that use HTTP or SIP requests to elect to conference into the original communication session 208.

The conference server 230 coordinates the conference session by sending "re-INVITE" SIP signals (arrows 235 and 255) to the first and second user devices (105 and 110). The conference server 230 also sends an "INVITE" SIP signal indicator to the one or more third user devices $138_1$-$138_n$ to join the conference session with the first and second user devices (105 and 110). Media may be "channel-agnostic", meaning communication data may be sent via channels that are off-net or via channels that are on-net. "Off-net" and "on-net" referring to "off network" and "on network" respectively refer to different mechanisms to which a connection is supplied. On-network referring to communications within network 115 and off-network referring to communications extending beyond the network 115. In alternative embodiments, the digital data of the media may be converted to analog signals for analog telephones. The proxy server 220, conference server 230, and media relay 225 intercommunication (arrows 246, 248) allows for seemingly seamless transfer to a conference session to the users.

In some embodiments, the media relay 225 coordinates communication data stream exchanges between the three user devices (105, 110, 138). The data streams (arrows 240, 250, 260) may include video and audio packets, for streaming communication between the user devices (105, 110, 138) in the conference session. The data packets for the conference session may include streaming audio and video transmitted using the real-time transport protocol (RTP) represented as (arrows 240, 250, 260). The details and functionality of RTP can be found for example, in the Internet Engineering Task Force (IETF) Request for Comments Paper No. 3550.

FIG. 3 is an illustration of an exemplary system 300 for automatically conferencing additional devices across networks in accordance with one or more embodiments of the invention. The system 300 includes user devices or mobile devices (105, 110, $138_1$-$138_n$), a local network 320, and an external for non-local network(s) 325. The system 300 allows one or more third user devices $138_1$-$138_n$ to tether to a first mobile device 105 in the local network 320 in order to join into an established communication session held between the first mobile device 105 and second mobile device 110 hosted on a non-local network(s) 325. In other embodiments, the first device 105 and the one or more third user devices 138$_1$-138$_n$ are on the same network as the second mobile device 110.

The non-local network(s) 325 in some embodiments may be a cellular carrier service comprising a network 115 of servers. The servers may include a proxy server 330 for signaling and a media relay 335. In some embodiments, the local network 320 may include of a range limited communication protocol (e.g., Bluetooth, Wi-Fi, and the like). Upon establishment of the communication session 308 on the non-local network 325, the first mobile device 105 notifies the one or more third user devices 138$_1$-138$_n$.

The one or more third user devices 138$_1$-138$_n$ may then be answered to join the communication session 308. In some embodiments, the first mobile device 105 may transmit communication data (e.g., audio) with audio of the one or more third user devices 138$_1$-138$_n$ as a single integrated stream (arrow 318). In such embodiments, the second mobile device 110 communicates via a single data stream (arrow 316). In some embodiments, the proxy server 330 and media relay 335 may be physically separate and distinct servers.

Figure 4:
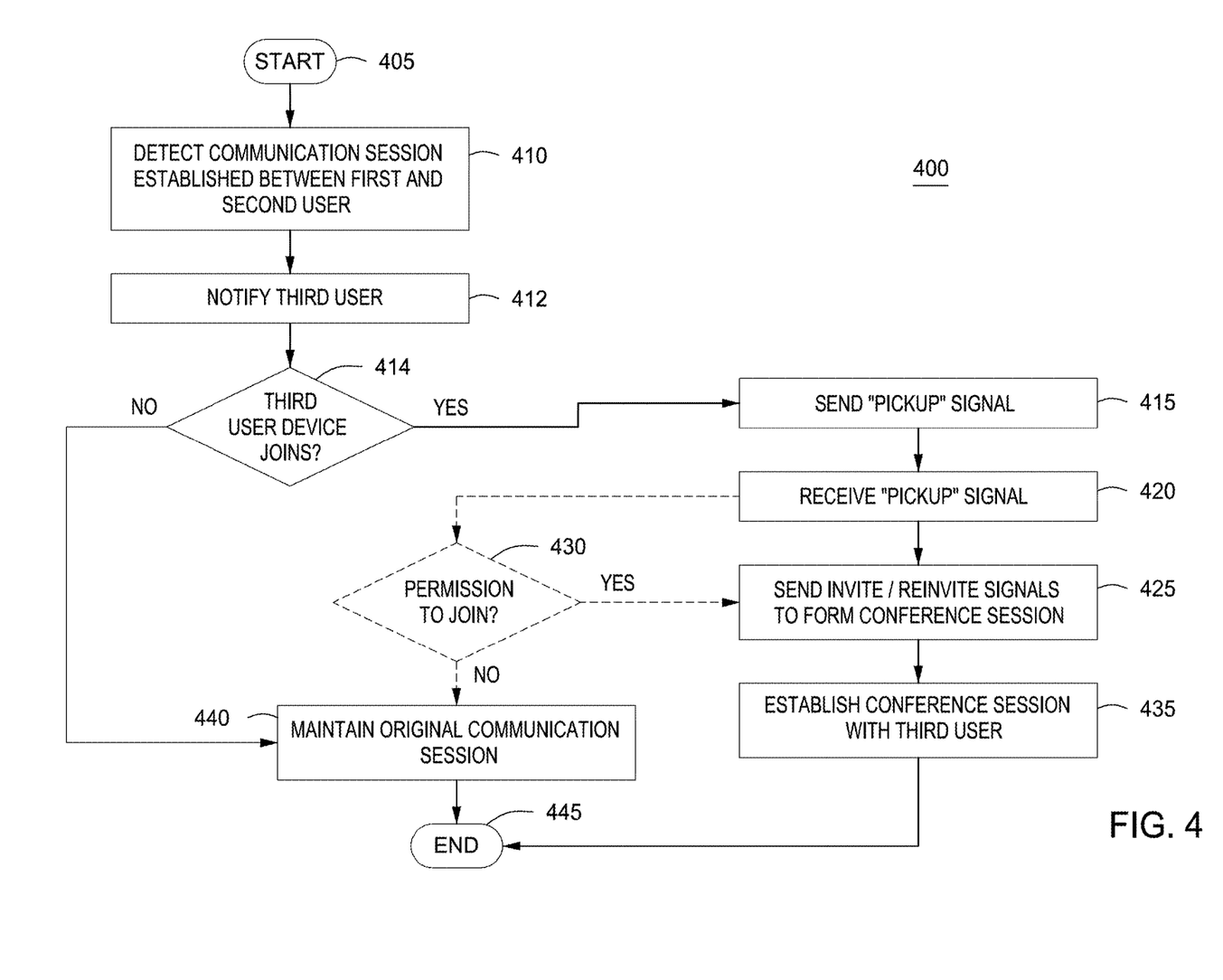
FIG. 4 is a flow diagram of an exemplary method for automatically conferencing additional devices in accordance with one or more embodiments of the invention.

FIG. 4 is a flow diagram of an exemplary method 400 for automatically conferencing additional devices in accordance with one or more embodiments of the invention as described above with respect to FIGS. 2A-3. The method 400, in some embodiments, is performed by the automated conferencing module 155, in other embodiments along the network 115. As noted above, the automated conferencing module 155 may be a module located on the first user device 105, or may be located on the proxy server 220 on network 115.

The network 115 or automated conferencing module 155 may include an pre-authentication service (e.g., as part of a VoIP service) such that at least two or more devices are associated with the same user account or profile. The associated devices are able to participate in the automatic conferencing session or in other embodiments, prompted with multiple on-going/active communication sessions. Further still, are embodiments wherein multiple accounts are associated to be prompted to join a conference session for accounts profiled as in frequent communication (e.g., accounts of three or more users who routinely speak every week).

The method 400 begins at step 405 and continues to step 410 where a communication session between two devices has been detected. At step 412, a third device 138 associated with the first user device 105 is notified that a communication session exists. The notification may be an audible ring tone, text message, flashing icon, alert, and the like, each of which may indicate the current active user devices. As described above with respect to FIGS. 2A-3, one or more third user devices 138$_1$-138$_n$ may be associated with the first user device 105, any one or all of which may be notified at step 412.

Optionally, in some embodiments, the third user is notified of multiple ongoing communication sessions at step 412. The multiple communication sessions may be shown as a list of selectable icons to join a prospective conference session.

Next, at step 414 it is determined whether the third user device 138 elects to join the communication session. In some embodiments, the user of the third user device 138 may elect to join the communication by answering a call, responding to a text message, or selecting a button provided by a mobile app stored on the third user device 138. If the third user device 138 elects not to join the communication session, the communication session is maintained at step 440 and ends at step 445. However, if at step 414, it is determined that the user selects to join the communication session, the method 400 continues to step 415 where a "pickup" signal is sent by the third user device 138 and received by the proxy server at step 420.

In some embodiments, the first user device 105 and/or the second user device 110 may be given an option to grant or deny permission for the third user device 138 to join at step 430 as described above with respect to FIGS. 2A-3. In embodiments where the second user device 110 may grant or deny permission, the second user device 110 must also be in the same VoIP service. If permission to join is denied, the original communication session is maintained at step 440. Optionally, the second user device 110 may also be notified about the denial of permission. The method 400 then ends at step 445. If permission is granted, the method 400 proceeds to 425.

At step 425, the third user device 138 may be automatically conferenced into the call between the first user device 105 and the second user device 110 by sending an invite signal to form a conference session. Re-invite signals are sent to the original two user devices and the communication session is handed off to a conference server to establish a conference session between the three devices at 435.

In some embodiments, the method 400 may determine whether at least three participant devices are present in the conference session. In some embodiments, if a participant device disconnects from the conference session, the communication session reverts to having the proxy server and media relay handling the communication session. The communication session is similar to the setup of the original communication session, and relinquishes processing resources to allow the conference server to host other conference sessions. The method then ends at step 445. In some embodiments, a tone or other notification may be used to identify to existing participant devices of the conference call that a new device has joined the conference session, similarly notification to the third user device 138 about the pending conference connection.

Figure 5:
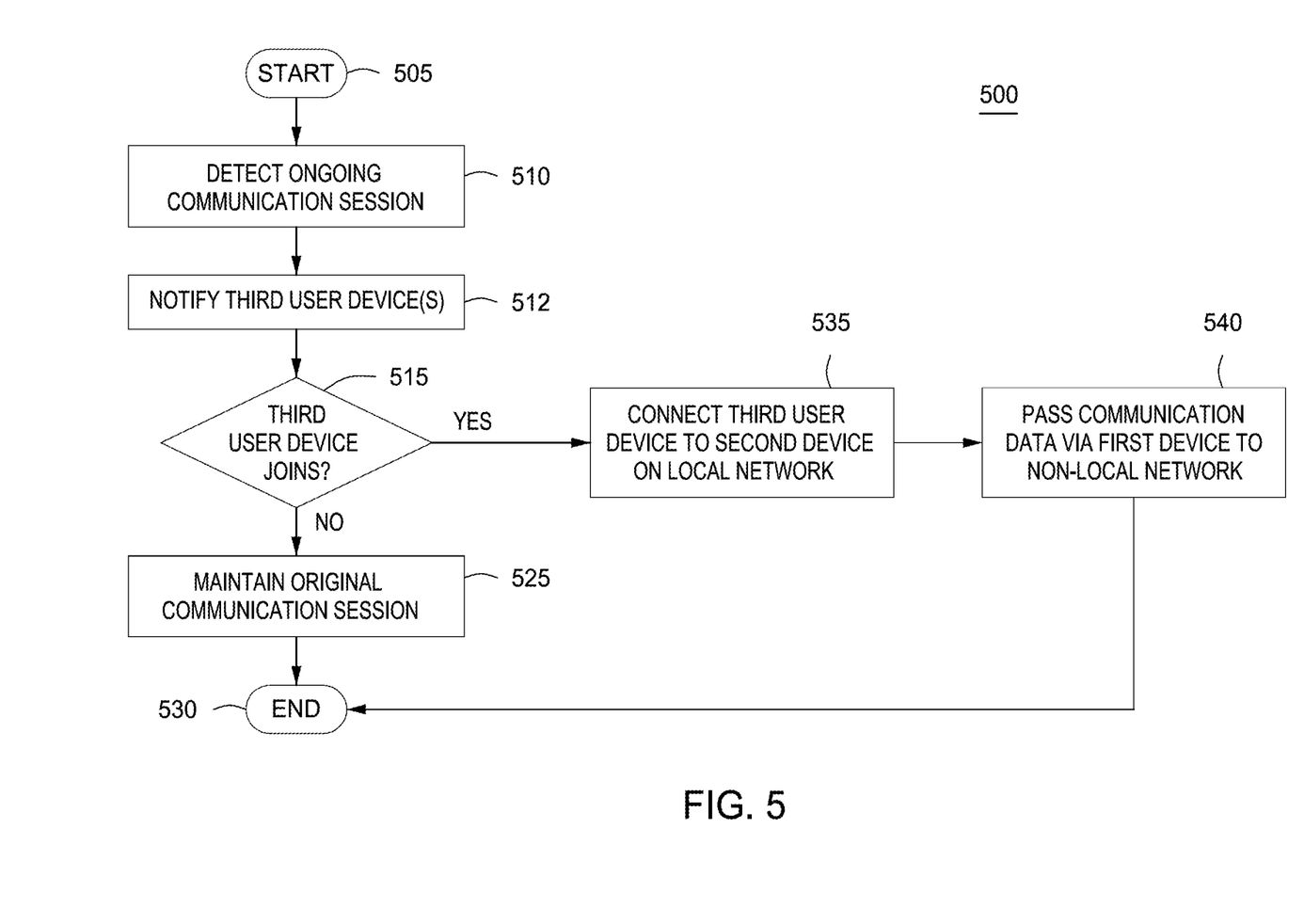
FIG. 5 is a flow diagram of an exemplary method for automatically conferencing additional devices across networks in accordance with one or more embodiments of the invention.

FIG. 5 is a flow diagram of an exemplary method 500 for automatically conferencing additional devices across networks in accordance with one or more embodiments of the invention as described above with respect to FIGS. 2A-3. The method 500 in some embodiments is processed by the automated conferencing module 155. As noted above, the automated conferencing module 155 may be a module located on the first user device 105, or may be located on the proxy server 220 on network 115. The method 500 begins at step 505 and continues to step 510 where a communication session between two user devices has been detected. At 512, a third user 138 associated with the first user device 105 is notified that a communication session exists. As described above with respect to FIGS. 2A-3, one or more third user devices 138$_1$-138$_n$ may be associated with the first user device 105, any one or all of which may be notified at step 505. The notification may be an audible ring tone, text message, flashing icon, alert, and the like. Next, at step 515, it is determined whether the third user device 138 elects to join the communication session. In some embodiments, the user of the third user device 138 may elect to join the communication by answering a call, responding to a text message, or selecting a button provided by a mobile/OTT app stored on the third user device 138. If the third user device 138 elects not to join the communication session, the communication session is maintained at step 525 and ends at step 530.

However, if determined at step 515 that the user joins the communication session, the method 500 continues to step 535. At step 535, the third user device 138 is connected to the first user device 105 via a local network connection (e.g., Bluetooth, Wi-Fi, and the like). The third user device 138 may include an account management module to authenticate with and couple to the first user device 105. The method 500 continues to step 540 wherein communication data of the first and third user devices (105 and 138) are passed through the first user device 105 on a non-local network to the second user device 110. The third user device 138 is thus tethered to the first user device 105 for mutual communication to the second user device 110. In some embodiments, the non-local network may be a cellular carrier. The method 500 then ends at step 530

The depicted method 500 shows an embodiment wherein the third user device automatically has permission to join the communication session. However, alternative embodiments may include a notification prompt to either of the first two user devices for permission to conference into the communication session.

Alternative embodiments in the above mentioned methods may include more than one additional device (e.g., fourth, fifth, sixth user device and the like). The elements of the methods may be performed in any order to achieve the automatic conferencing. Further still are embodiments wherein either the first or second user device 110s can choose to decline the additional user devices from joining or disconnect additional user devices. In such embodiments, the remaining conference session also reverts to a communication session hosted by the proxy server and media relay.

Figure 6:
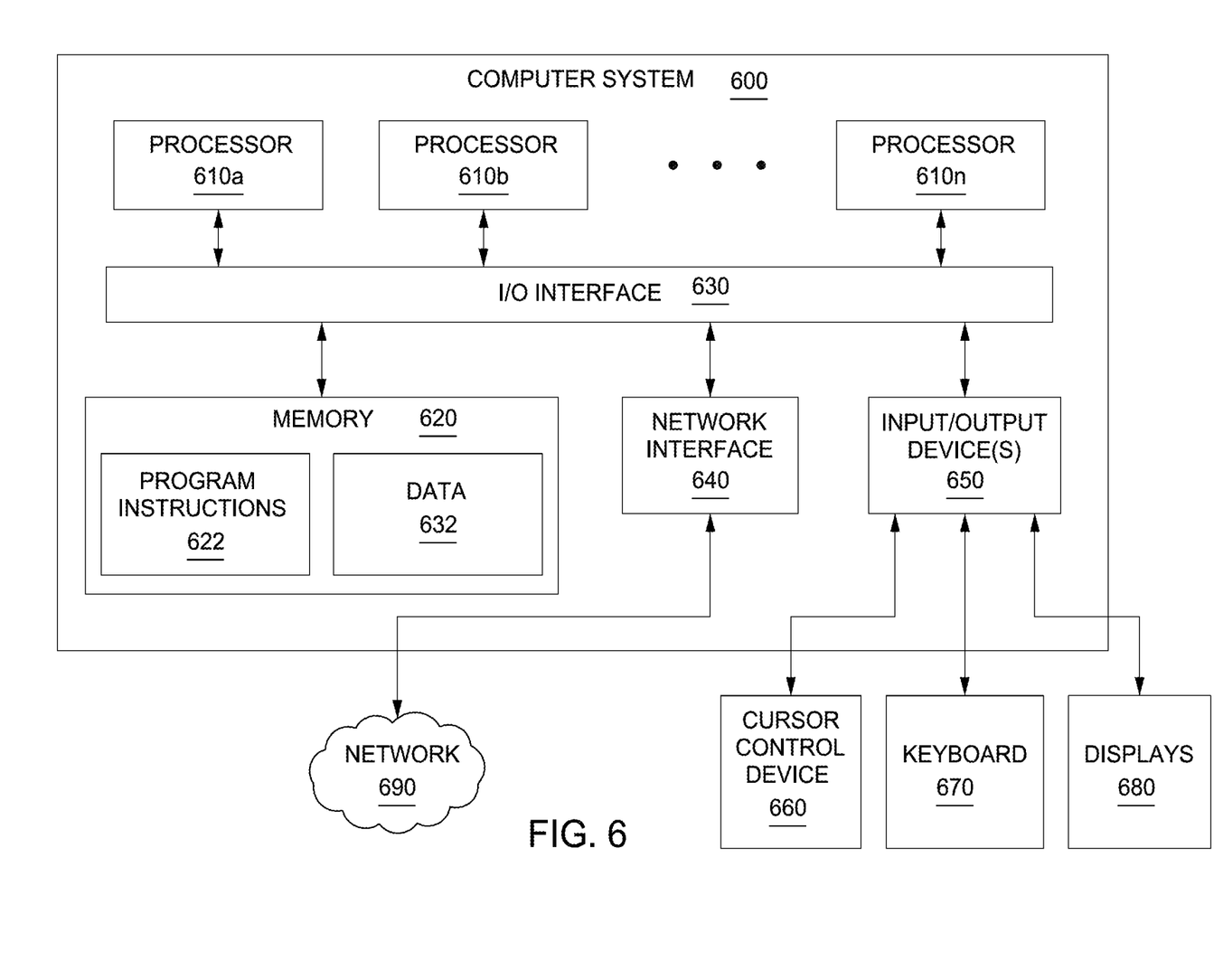
FIG. 6 is a depiction of a computer system that can be utilized in various embodiments of the present invention.

FIG. 6 is a depiction of a computer system 600 that can be utilized in various embodiments of the present invention. The computer system 600 includes substantially similar structure comprising servers or electronic devices in the aforementioned embodiments.

Various embodiments of methods and system authenticating users for communication sessions, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement methods 400, and 500 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 660, such as cursor control device 660, keyboard 670, and display(s) 680. In some embodiments, the keyboard 670 may be a touchscreen input device.

In various embodiments, any of the components may be utilized by the system to authenticate a user as described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display devices, keyboards, keypads, cameras, touchpads, touchscreens, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIGS. 4, and 5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for handling calls between associated devices of a shared telephony account, comprising:
   establishing a communication session between a first end-user device and a second end-user device;
   receiving a first notification message from the first end-user device indicating that the communication session is at least one of visible or joinable by one or more devices associated with the first end-user device, wherein the one or more devices are associated with the first end-user device when the one or more devices are one of (i) pre-registered and stored with an association to the first end-user device, (ii) pre-authenticated to tether the one or more devices to the first end-user device, or (iii) pre-associated with a same user account profile; and
   sending a second notification message to the one or more devices associated with the first end-user device indicating that a user of each of the one or more devices associated with the first end-user device may at least one of join or listen to the communication session, wherein the user of the first device is not the user of the one or more devices associated with the first end-user device.

2. The method of claim 1, wherein the first notification message designates the communication session as one of (a) visible and joinable by one or more devices associated with the first end-user device, (b) visible but not joinable by one or more devices associated with the first end-user device, or (c) joinable in listen only mode by one or more devices associated with the first end-user device.

3. The method of claim 1, further comprising:
receiving a request from at least one of the one or more devices associated with the first end-user device to join the communication session; and
establishing a conference session with the first end-user device, the second end-user device, and the at least one of the one or more devices associated with the first end-user device that requested to join the communication session.

4. The method of claim 3, further comprising:
receiving a request to establish a private line between the first end-user device and the at least one of the one or more devices associated with the first end-user device participating in the conference session.

5. The method of claim 4, further comprising:
establishing the private line between the first end-user device and the at least one of the one or more devices associated with the first end-user device participating in the conference session while the conference session is active.

6. The method of claim 3, wherein establishing the conference session includes sending an invitation message to one or more devices associated with the first end-user device for a conference session; and
sending a re-invitation message to the first end-user device and second-end user device for the conference session.

7. The method of claim 3, wherein the communication session is established via a proxy server, and wherein establishing the conference session includes routing the communication session to a conference server hosting the conference session.

8. The method of claim 3, wherein data streams from each end-user device are coordinated in the conference session via a media relay.

9. The method of claim 1, further comprising:
receiving a request to share screen images related to the communication session displayed on the first end-user device with the one or more devices associated with the first end-user device.

10. A method for automating conferencing in a communication session, comprising:
receiving a request to establish a communication session between a first end-user device and a second end-user device;
determining one or more third end-user devices associated with the first end-user device that should be notified of the communication session based on configuration settings stored in association with the first end-user device, wherein the one or more third end-user devices are associated with the first end-user device when the one or more third end-user devices are one of (i) pre-registered and stored with an association, (ii) pre-authenticated to tether the one or more third end-user devices to the first end-user device, or (iii) pre-associated with a same user account profile; and
sending a notification message to each of the determined one or more third end-user devices that should be notified to join the established communication session, indicating that a user of each of the one or more devices associated with the first end-user device may at least one of join or listen to the communication session, wherein the user of the first device is not the user of the one or more devices associated with the first end-user device.

11. The method of claim 10, further comprising:
receiving a request from at least one of the one or more third end-user devices associated with the first end-user device to join the communication session; and
establishing a conference session with the first end-user device, the second end-user device, and the at least one of the one or more third end-user devices associated with the first end-user device that requested to join the communication session.

12. The method of claim 10, wherein determining one or more third end-user devices associated with the first end-user device that should be notified of the communication session based on configuration settings includes:
determining the one or more third end-user devices that are authorized in the configuration settings to participate in communication sessions associated with a communication identifier of the second end-user device.

13. The method of claim 10, wherein determining one or more third end-user devices associated with the first end-user device that should be notified of the communication session based on configuration settings includes:
determining the one or more third end-user devices that include a communication identifier of the second end-user device in their address book.

14. The method of claim 10, wherein determining one or more third end-user devices associated with the first end-user device that should be notified of the communication session based on configuration settings includes:
determining the one or more third end-user devices that have participated in previous calls with the second end-user device.

15. The method of claim 10, wherein determining one or more third end-user devices associated with the first end-user device that should be notified of the communication session based on configuration settings includes:
monitoring a communication session established between the first end-user device and the second end-user device;
determining that one or more words spoken during the communication session is similar to one or more pre-defined keywords; and
determining the one or more third end-user devices configured to be notified when a keyword similarity match is identified.

16. A method for automating conferencing in a communication session, comprising:
receiving, at a third end-user device associated with a first end-user device, a notification of an established communication session between the first end-user device and a second end-user device, wherein the third end-user device is associated with the first end-user device when the third end-user device is one of (i) pre-registered and stored with an association to the first end-user device, (ii) pre-authenticated to tether the third end-user device to the first end-user device, or (iii) pre-associated with a same user account profile, and wherein the notification indicates that a user of the third end-user device may at least one of join or listen to the communication session, wherein the user of the first end-user device is not the user of the one or more devices associated with the third end-user device;
displaying an indication of the communication session and whether the communication session may be joined based on the notification received;
sending a request to join the established communication session; and establishing a conference session with the first end-user device, the second end-user device, and the third end-user device.

17. The method of claim 16, wherein the received notification indicates that the communication session is one of joinable with full participation or joinable in listen only mode.

\* \* \* \* \*